United States Patent [19]

McMurray et al.

[11] 4,352,219
[45] Oct. 5, 1982

[54] PREVAILING TORQUE LOCK NUT AND METHOD OF FORMING SAME

[76] Inventors: John C. McMurray, 6957 N. Meadow Dr., Painesville, Ohio 44077; Arthur G. Kudelko, 7434 Crown Ct., Mentor, Ohio 44060

[21] Appl. No.: 251,779

[22] Filed: Apr. 7, 1981

Related U.S. Application Data

[62] Division of Ser. No. 17,611, Mar. 5, 1979, Pat. No. 4,291,737.

[51] Int. Cl.³ ............................................. B21D 53/20
[52] U.S. Cl. ....................................... 10/86 A; 10/73; 10/79; 10/86 F
[58] Field of Search ...................... 10/73, 75, 79, 86 A, 10/86 F

[56] References Cited

U.S. PATENT DOCUMENTS 3,496,582  2/1970  Johnson ............................. 10/86 A
3,621,502  11/1971  Velthoven ...................... 10/86 A X

*Primary Examiner*—Mark Rosenbaum
*Assistant Examiner*—Timothy V. Eley
*Attorney, Agent, or Firm*—Pearne, Gordon, Sessions, McCoy & Granger

[57] ABSTRACT

A tri-lobular, all metal, prevailing torque nut is disclosed providing a cone having three locking sections, each of which extends around the threaded opening for about one-third of the surface of its thread. Each locking section provides a minimum radial distance at its center and extends with gradually increasing radial distance to the ends thereof. When the nut is threaded onto a mating threaded fastener, portions of each locking section are radially displaced from their unstressed condition to the circular shape of the mating fastener, producing frictional engagement between the nut and the fastener to resist unintentional loosening. Each locking section is arranged so that it provides a maximum resistance to deflection at its center and decreasing resistance to deflection at locations progressively spaced from the center so that excessive pressures are not developed which would tend to produce excessive wear or permanent deformation. Consequently, the locking torque or friction is maintained at satisfactory levels, even when the nut is assembled and disassembled with a mating threaded fastener a number of times. The nut is produced by forming a nut blank with a cone having three lobes symmetrically positioned around the cone which are deformed radially inward during staking to produce the locking sections along the threaded passage adjacent to the cone end of the nut.

4 Claims, 7 Drawing Figures

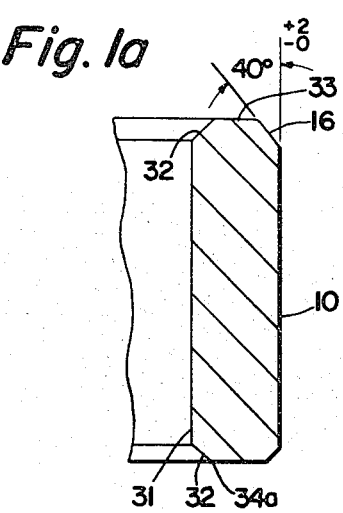
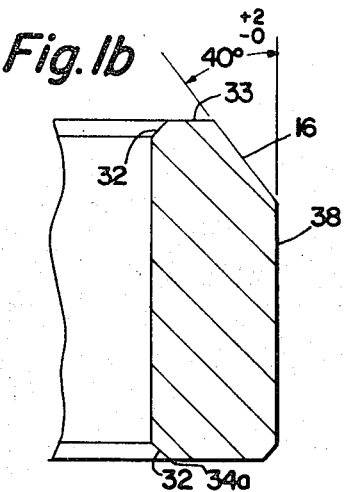
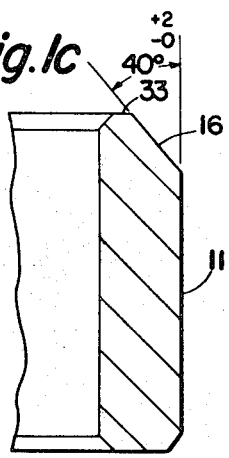
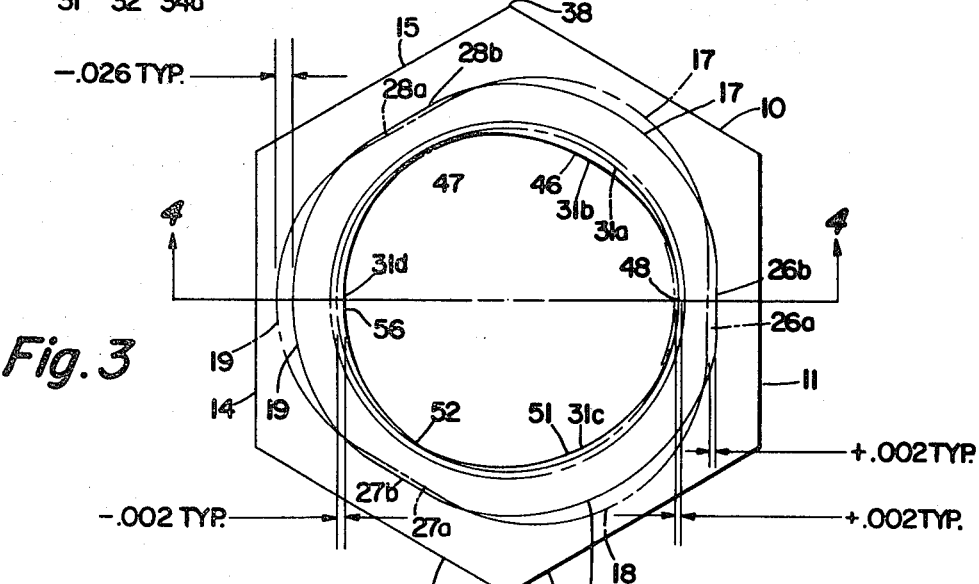
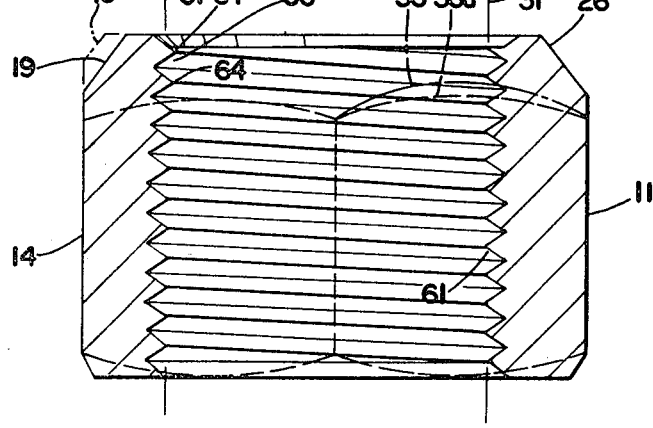

PREVAILING TORQUE LOCK NUT AND METHOD OF FORMING SAME

This is a division of application Ser. No. 017,611, filed Mar. 5, 1979, now U.S. Pat. No. 4,291,737.

BACKGROUND OF THE INVENTION

This invention relates generally to prevailing torque fasteners and, more particulary, to a novel and improved trilobular prevailing torque lock nut and to a novel and improved method of producing such nuts.

PRIOR ART

The general type of prevailing torque lock nut to which this invention relates provides locking sections along the threaded passage having an interference fit with a mating threaded fastener. When such nuts are threaded onto the fastener, friction is developed to resist unintentional loosening.

High quality prevailing torque lock nuts must be capable of being repeatedly assembled and disassembled on the mating fastener without excessive loss of this frictional locking characteristic. In the testing of such nuts they are repeatedly assembled and disassembled with a mating threaded fastener while measuring both the "on" torque and the "off" torque. The performance standards for such nuts require that the first "on" torque not be excessive and that the "off" torque should not drop below the specified values even after the nut has been assembled and disassembled a specified number of times, for example, from five to fifteen times.

In most prior art prevailing torque lock nuts of the type involved here, the locking sections develop sufficient pressure to cause either thread wear or permanent deformation, with the result that the "off" torque continues to drop to levels which are unacceptable as the nut is repeatedly assembled and disassembled.

The patents to Johnson U.S. Pat. Nos. 3,340,920 and 3,496,582 describe a prevailing nut structure and a method of manufacture in which one end of the threaded bore is deformed to an oval or elliptical shape to produce two opposed locking sections which provide an interference fit with the mating fastener. Nuts of such type are intended to be arranged so that the deformation of assembly does not produce high localized pressures and so that permanent deformation and wear are minimized. A similar type of nut is described in the patent to Meyfarth U.S. Pat. No. 3,412,772.

When the general concepts of these Johnson patents are properly applied to cone nuts, good prevailing torque characteristics are obtained. However, difficulty is encountered in some instances where the height of the nut is limited by specifications, as in low profile nuts, and in flange nuts. In such instances, the required cone height for good prevailing torque characteristics results in a decrease in the height of the hexagonal wrenching portion below required standards. This is partially due to the fact that the height or length of the corners of the wrenching portion are not uniform when an oval or elliptical cone locking structure is provided and the shorter of such wrenching corners do not meet the wrenching height standards required. Further, with such nuts, the cone provides high stiffness adjacent to the corners of the nut spaced from the centers of the locking sections. This may result in zones of localized high pressure which tend to cause wear of the threads and loss of the locking torque. In addition, with such structure in which there are two opposed locking sections, it may be necessary in some instances to provide a relatively high cone to reduce the effect of the hexagonal wrench portion on the flexibility characteristics of the locking sections.

It is also known to provide prevailing torque hexagonal nuts with three symmetrically arranged locking sections. Examples of such lock nut are described in Skidmore U.S. Pat. No. 2,923,339 and the Johnson U.S. Pat. No. 3,456,704. All of the patents referred to above are incorporated herein by reference.

SUMMARY OF THE INVENTION

In accordance with the present invention, a novel and improved tri-lobular prevailing torque lock nut is provided in which the nut is formed with a cone end having three separate locking sections, each providing an interference fit, to produce locking torque that is maintained over a relatively large number of assembly and disassembly operations. Such nut provides a large area of frictional engagement in which the pressure of engagement is relatively low and uniform while still providing the desired frictional torque values. Consequently, wear and permanent deformation are minimized.

With this invention, the nut is produced more accurately and with less severe deformation because it is not necessary to move material as far during the operation of forming the blank. Also, the staking operation employed to establish the three locking sections is not as severe as in prior art devices, such as for example in the Johnson patents '921 and '582, supra. Further, the axial depth of the interference fit is less and a given nut has a greater free-turn thread length than nuts manufactured in accordance with the general teaching of the first two Johnson patents mentioned above. Preferably, the lobes are oriented with the flats of the hexagonal wrenching portion. With such orientation, the corners of the wrenching portion have a uniform height and the required minimum wrenching portion height can be produced with a lower profile nut or a flange nut of lesser height. Additionally, the tri-lobular arrangement centers better with a mating fastener to produce a more uniform frictional torque. This is true even when the mating fastener is slightly oval as a result of the thread rolling operation often used to form such mating fastener. Still further, the tri-lobular structure provides a more uniform cone height and in a given nut can provide better deflection characteristics of the locking sections without excessive loss of wrenching height.

In accordance with the preferred embodiment illustrated, the prevailing torque lock nut is provided with three peripherally spaced locking sections which are shaped to provide substantially uniform, relatively low pressure over a substantial area so that the frictional torque is maintained even when the nut is assembled and disassembled a substantial number of times. Because each locking section has a relatively short peripheral length and because it is more symmetrical with respect to the hexagonal wrenching portion when compared to the nuts having two opposed locking sections, the deflection characteristics of each locking section are not affected as greatly by the noncircular shape of the hexagonal wrenching portion, and it is possible to obtain better deflection characteristics with a given cone height. Further, because three locking sections are spaced around the cone, a smaller amount of deflection along each section provides the required area of frictional contact than tends to be required with an oval or elliptical type having only two locking sections. A nut in accordance with this invention does not require as great a cone height to provide the desired performance.

The features set forth above, along with other features of the present invention, are more fully described in the following specification and drawings.

BRIEF DESCRIPTION OF THE DRAWINGS

FIGS. 1a, 1b, and 1c are fragmentary, longitudinal sections taken along 1a—1a, 1b—1b, and 1c—1c of FIG. 1, respectively, with the threads eliminated for purposes of illustration;

FIG. 3 is a plan view similar to FIG. 1 but illustrating the final prevailing torque lock nut after the staking operation and further illustrating the amount of deflection produced by the staking operation; and FIG. 4 is a cross-sectional view taken generally along 4—4 of FIG. 3.

DETAILED DESCRIPTION OF THE DRAWING

Figure 1:
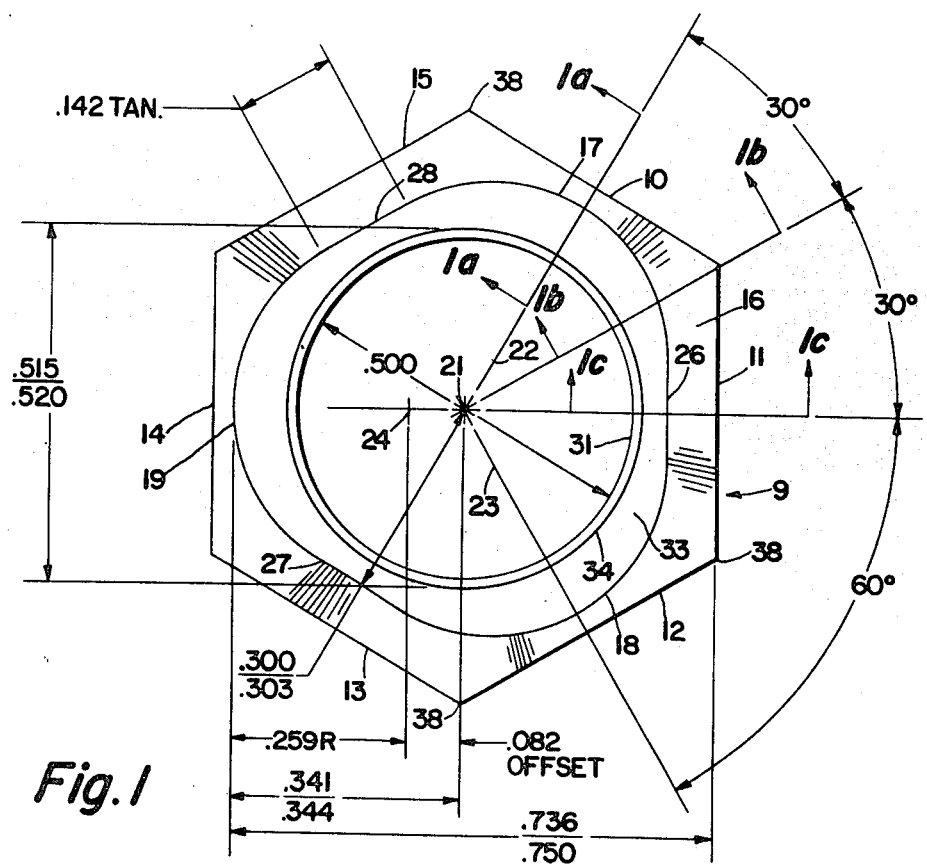
FIG. 1 is a plan view of the cone end of a threaded blank of a prevailing torque lock nut, in accordance with this invention, before the staking operation.
Figure 2:
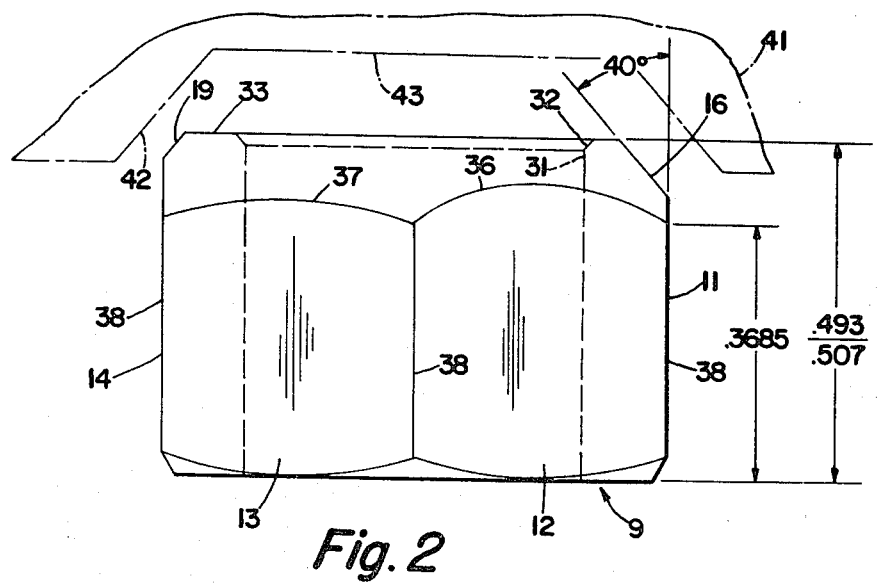
FIG. 2 is a side elevation of the lock nut blank illustrated in FIG. 1 and the staking tool used to complete its manufacture illustrated in phantom.

FIGS. 1 through 4 illustrate a preferred embodiment in which the gripping or locking sections are aligned with the flats of the wrenching portion. Illustrative dimensions are illustrated in some figures, as discussed below. Before staking, the blank 9 is shaped as illustrated in FIGS. 1 and 2. In such condition, the wrenching portion is a regular hexagon having six flats 10 through 15. The cone end 16 of the blank is formed with three lobes 17, 18, and 19 aligned with the flats 10, 12 and 14, respectively. Preferably, each lobe is a portion of a right circular cone having an eccentric axis displaced radially from the central axis 21 of the nut. The cone axis of the lobe 17 is at 22, the cone axis of the lobe 18 is at 23, and the cone axis of the lobe 19 is at 24. Three similar tangential sections 26, 27, and 28 join the lobes.

Prior to staking, the bore of the blank is tapped to provide normal threads in which the roots and crests have a uniform diameter and extend along two cylinders of uniform radius. The cylinder containing the crests is indicated at 31 and the ends of the blank are formed with chamfers or countersinks 32 intersecting the flat end 33 of the cone portion along the circle 34 and intersecting the load face at 34a. Normally the chamfer is formed so that the circle 34 has a diameter substantially equal to or greater than the major screw diameter or root diameter of the nut threads. The slope of the cone end of the blank is preferably uniform, and in the illustrated embodiment is about 40°. However, other angles, such as 30°, may be used, as discussed below.

The adjacent flats 10 through 15 of the blank are not all identical, as best illustrated in FIG. 2. The flats 10, 12 and 14 aligned with the lobes extend higher than the flats 11, 13, and 15, which are adjacent to the tangential portions. It should be understood that the flats 10, 12, and 14 are substantially identical to each other and that the flats 11, 13, and 15 are substantially identical to each other.

As best illustrated in FIG. 2, the upper edge 36 of the flat 12 is higher than the upper edge 37 of the flat 13. This is because the radial distance between the lobe 18 and the flat 12 is less than the radial distance between the tangential portion 27 and flat 13. However, the height of the corners 38 is uniform. Consequently, there are no corners 38 which are shorter than other corners and a minimum loss of wrenching corner height is provided for a given nut and cone height. Consequently, nuts can be manufactured with a lower profile while still providing the required wrenching height structure normally specified.

The finishing of the nut is accomplished by displacing the lobe material radially inward. This may be accomplished by a staking tool 41 illustrated in phantom in FIG. 2. Such tool is formed with a recess having a conical sidewall 42 which is part of a right circular cone extending to an end wall 43. The height of the cone of the recess is selected so that the diameter of the inner end wall 43 is smaller than the finished end surface of the finished nut so that the end wall 43 does not engage the end face 33 of the nut blank during the staking operation. Similarly, the open end of the conical recess is selected to be larger than the maximum diameter of the nut. With such a structure, when the staking tool is moved vertically down against the nut blank, as illustrated in FIG. 2, the nut blank is engaged only by the conical sidewalls 42 of the recess.

The cone angle of the conical wall 42 may be equal to or slightly less than the cone angle of the lobes, but is preferably selected to be slightly greater than the cone angle of the lobes 17 through 19. For example, in the illustrated embodiment in which the cone angle of the lobes is 40°, the cone angle of the staking tool may be about 45°. The cone angle of the staking tool, in the illustrated embodiment, is between about 43° and 50°. Consequently, as the tool 41 is brought down against the blank, the initial engagement is along the outer edges of the lobes 17 through 19 adjacent to the upper surface 33 and as the tool is pressed down against the blank, the lobes 17 through 19 are pressed radially inward with progressively increasing engagement between the cone surface 42 and the lobes. After staking, the cone angle of the nut is essentially the same as the cone angle of the tool.

The operation of the staking tool 41 is to deform the lobes radially inward as best illustrated in FIG. 3. The phantom lines 17, 18, and 19 indicate the extremities of the lobes before staking and the full lines 17 through 19 indicate the position after staking. Similarly, the upper edges 36 of the flats 10, 12, and 14 are displaced downwardly, as indicated in FIG. 4, from 36 to 36a. The staking operation causes the portions of the circles 31 and 34 to be displaced inwardly along their respective lobe sections between the phantom line positions and the full line positions in FIG. 3. For example, the phantom line 31a indicates the position along the lobe 17 of the circle 31 prior to staking and the full line 31b indicates the position of such circle after such staking. A similar situation exists with respect to the other two lobes 18 and 19 wherein the position after staking within the lobe 18 is illustrated at 31c and within the lobe 19 is indicated at 31d.

During the staking operation, the tangential portions 26, 27, and 28 may displace slightly radially outward from the original position indicated in phantom at 26a, 27a, and 28a to the full line positions at 26b, 27b, and 28b. The portions of the circle 31 adjacent to the tangential portions are also displaced outward a slight amount, as indicated by the spacing between the original position as illustrated in phantom and the after-staked position illustrated in full line.

The staking operation provides three identical locking sections. A locking section 46 extends from about the point 47 to the point 48 having a minimum radial distance at its center opposite the center of the flat 10 and having gradually increasing radial distance to its ends at 47 and 48. A second locking section 51 extends from about the point 48 to the point 52 within the lobe 18, with the minimum radial distance located opposite the center of the flat 12. A third and similar locking section 56 extends from the point at about 47 to 52 in the lobe 19. Here again, the minimum radial distance is provided opposite the center of the flat 14.

These three locking sections 46, 51, and 56 provide thread portions having a radial distance slightly less than the radius of the thread of the mating threaded fastener so that as the fastener is threaded through the finished nut an interference is developed at three symmetrically located positions around the mating fastener, which causes the cone portion of the nut to be displaced from its original position and produces locking friction between the nut and the mating fastener.

The radial distance of the threads between the locking sections at 47, 48, and 52 is normally increased slightly during staking. Since the thread originally formed through the nut prior to staking is larger than the thread of the mating fastener to provide normal thread clearances, the radial distance of the threads at 47, 48, and 52 is larger than the threads of the mating fastener by at least an amount equal to normal thread clearance.

FIG. 4 illustrates the section of the thread through one of the locking sections 56 on the left side of the figure and a section of the thread on the right side through the point 48 which is not deformed inwardly during the staking operation. Consequently, the threads at 61 along the right side of FIG. 4 have crests which lie substantially along a portion of the original cylinder indicated by the dotted line 31. Because the radially outward displacement along the tangential portions 26 is very small, it has not been illustrated in FIG. 4. However, the threads along the left side at the locking section 56 are displaced at the upper portion thereof from the corresponding portion of the original cylinder 31 so that the crests at the upper end of the nut, as indicated at 64, are displaced radially inward from the original cylinder 31. The maximum radial displacement of the threads along the locking portions 46, 51 and 56 exists at the top or cone end of the nut and tapers back to the original thread radius at least by about the middle of the nut so that the threads in the lower half of the nut are not displaced. Consequently, a mating threaded fastener can be freely turned into the nut until it projects a substantial distance into the nut, and it is only as the threaded fastener approaches the upper or cone side of the nut that the interference is developed.

As the prevailing torque lock nut in accordance with this invention is threaded onto the mating part to a point where the interference is developed between the three locking sections 46, 51, and 56, continued assembly causes the three locking sections to be deformed from the unstressed condition until they approach a circular shape having essentially the same curvature as the curvature on the mating threaded part. Because the radial distance of the locking sections is at a minimum at their centers, the greatest radial displacement occurs at the centers of the locking sections, with the amount of radial displacement decreasing from the centers toward the ends of the locking sections.

The locking torque produced by the frictional contact between the locking sections and the mating threaded fastener is a function of the coefficient of friction between the two parts and the total force between the engaging surfaces. If the total force is exerted over a small area, excessive pressures are encountered which tend to produce permanent deformation of the parts and excessive wear or galling in the threads of both nut and bolt. The occurrence of either of such conditions causes a loss of locking torque as the nut and mating threaded fastener are repeatedly assembled and disassembled.

In order to eliminate such a loss of locking torque, the structure of the prevailing torque nut is arranged so that the required force is developed over a substantial area so that the localized pressure is sufficiently low to prevent permanent deformation or material wear or galling. With the illustrated structure described above, improved performance is achieved because the deformation of the locking sections occurs in such a way that substantial areas of contact are provided between the locking sections and the mating threaded fastener and wherein the pressure of engagement is distributed over such areas of engagement in a relatively uniform manner. Consequently, the required total force necessary to obtain the required locking torque is obtained without excessive localized pressure.

The cone of the nut may be considered to be a complex curved cantilever beam with three structurally similar beam sections symmetrically positioned around the cone end of the nut which are displaced or deflected from their unstressed condition by their engagement with the mating threaded fastener. The maximum deflection of each beam section occurs at the center, with decreasing amounts of deflection occurring in both directions along the beam section from the center. If such beam is to be deflected in such a manner with a relatively uniform loading over a substantial portion of the circumferential length of the beam section, the beam should preferably provide a maximum stiffness or resistance to deflection at its center and decreasing stiffness or resistance to deflection at locations progressively spaced from its center substantially throughout the zone of locking engagement with the mating thread.

In the illustrated structure, the maximum stiffness is provided at the center of the three locking beam sections and the stiffness thereof decreases progressively from such center to locations substantially radially inward from the adjacent corners. In such structure, there is a tendency for stiffness to then increase beyond such locations, but such stiffness reversal is not particularly severe so it does not tend to produce significantly high zones of localized pressure. In fact, the stiffness at the ends of the beam sections is substantially below the stiffness at the centers even though such stiffness reversal occurs. Further, in practice, the zones of actual locking engagement do not tend to extend materially beyond the corners so such stiffness reversal does not materially contribute to loss of locking friction even when the nut is repeatedly assembled and disassembled on a mating threaded part. The various proportions, however, are preferably arranged to provide three zones of locking engagement which have a total peripheral length of at least about 50% of the thread periphery and the stiffness reversal does not occur along such zones of locking engagement unless the total length thereof exceeds such percentage.

FIGS. 1a, 1b, and 1c, which are sections taken through the center of lobes 17 prior to staking, illustrate that the height of the cone 16 at the 0° position in FIG. 1a is a minimum or much smaller than the height of the cone illustrated at the 30° position in FIG. 1b, and illustrated in the 60° position through the tangential section illustrated in FIG. 1c. Conversely, the width of the top surface 33 is greatest at the section of FIG. 1a, decreasing in the section of FIG. 1b and further decreasing in the section of FIG. 1c.

It is recognized that after staking the cone height through the locking sections increases compared to the cone height before staking (as illustrated in between the phantom position of 19 and the full line position of 19 in FIG. 4), but the thickness-to-cone height relationship remains such that the locking sections have the greatest stiffness at their centers and progressively lesser stiffness at locations progressively further away from the centers throughout the zones of locking engagement. This is true even though the structure is complex and cannot be considered to be a simple curved cantilever beam. The complex nature of the beam structure is created to a great extent because of the fact that the cone, which is substantially circular after staking, has a height which changes due to the fact that the cone extends down to a hexagonal wrenching portion.

With the illustrated structure, however, it appears that the desired stiffness distribution is obtained even in nuts of relatively low cone height and the stiffness of the cone radially in from the corners 38 is less than the stiffness at the centers of the locking sections. In other words, the illustrated structure does not appear to encounter a significant stiffness reversal within the zones of locking engagement that are encountered in somewhat similar prior art devices of the type mentioned above, and therefore does not encounter areas of localized high pressure existing in prior art devices having a low cone height.

It should be understood that the effect of the hexagonal wrenching portion on the stiffness excursions along the locking zones of the cone decreases as the cone height increases. Therefore, where the nut specification permits, lower cone angles and higher cone heights are desirable for prevailing torque characteristics. On the other hand, good results are provided even with the low cone height illustrated and described herein.

In addition, when the prevailing torque nut in accordance with the present invention is arranged so that the lobes prior to staking are located in alignment with the flats, a uniform corner height exists completely around the wrenching portion, with each of the corners 38 having the same height as the other corners 38 of the lock nut. Because proper locking characteristics can be obtained with a relatively low cone height, and because the corners of the wrenching portion are uniform in height, it is possible to produce a properly performing prevailing torque lock nut in accordance with the present invention which has a low profile or, in the case of flange nuts and the like, has the desired locking characteristics without excessive height requirements. Further, since a tri-lobular structure is provided, the nut will perform satisfactorily without excessive stresses or pressures, even when the mating threaded part is slightly out of round and is somewhat oval or elliptical as a result of thread rolling operations used in its manufacture.

The dimensions of a nut blank used to form a one-half inch prevailing torque lock nut which has been successfully manufactured and tested in accordance with the present invention are illustrated. Such nut blank was staked to produce deformations, as best illustrated in FIG. 3. During the staking operations, the centers of the lobes were deformed radially inward at their outer top edges in an amount of about 0.026 in. The centers of the locking sections were deformed inwardly about 0.012 in. Both the interior and exterior of the top of the cone at the tangential sections were displaced radially outward about 0.002 in. The difference between the radial displacement of the outer edges of the lobes and the radial displacement of the locking sections, namely the difference between 0.026 in. and 0.012 in., appears to result from an axial and peripheral displacement of material caused by the axial movement of the staking tool with respect to the blank. When the cone angles are no greater than the angles mentioned above, the staking operation does not result in excessive axial displacement of material. In such nut, the displacement of the threads to form the locking sections was confined to the upper portion of the nut and the nut provided free turning on a mating threaded fastener for a distance exceeding one-half the height of the nut. Further, in such nut good performance was achieved with a maximum cone height of no greater than about one-quarter of the major diameter of the threads.

Such illustrated nut was dimensioned to provide relatively large eccentricity of the lobes partially to determine if a locking fastener in accordance with this invention would function satisfactorily in an extreme design configuration. Such nut provided engagement with the mating part along the top or cone end thread for about 55% of the total circumferential thread length. This compares very favorably with lock nuts having two locking sections of the type described in the Johnson U.S. Pat. No. 3,340,920, wherein much lower eccentricity was provided.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of producing hexagonal prevailing torque lock nuts comprising forming a tubular blank with a load face at one end, a cone portion at the other end and a hexagonal wrenching portion therebetween wherein said cone portion is formed with three peripherally positioned lobes each of which is substantially a portion of a right circular cone having an axis parallel to and eccentric with respect to the central axis of said blank, said lobes being joined by substantially tangential portions and each being aligned with a flat of said wrenching portion, threading said blank with a uniform diameter thread, and thereafter applying a staking force to said cone portion with a tool having a blank engaging surface operable to deform said lobes at least along the end thereof to a substantially circular shape in the vicinity of locking zones and to displace portions of said thread within said lobes radially inward to produce three locking sections which provide an interference fit with a mating threaded fastener.

2. A method of producing prevailing torque lock nuts as set forth in claim 1, wherein said staking forces are applied in a manner causing said lobes to be radially displaced until their outer surfaces form three portions of a single right circular cone, with said ends of said three portions being joined by intermediate substantially flat portions.

3. A method of producing prevailing torque lock nuts as set forth in claim 1, wherein said blank is formed so that said lobes and tangential portions are each aligned with an associated flat of said wrenching portion, and said lock nut is formed to provide said wrenching portions with corners having equal height.

4. A method of producing prevailing torque lock nuts as set forth in claim 3, wherein said staking force is applied initially at said other end of said blank, and as said lobes are deformed said staking forces are applied progressively to portions of said lobes spaced from said other end, and terminating said application of said staking forces before said cone portion is fully deformed whereby portions of said tangential portions remain and said wrenching portion is not materially deformed.

* * * * *